INVENTOR.
Engelbert A. Meyer
BY
E. W. Christen
ATTORNEY

Dec. 24, 1963　　　E. A. MEYER　　　3,114,949
FASTENING DEVICE
Filed Jan. 10, 1961　　　2 Sheets-Sheet 2
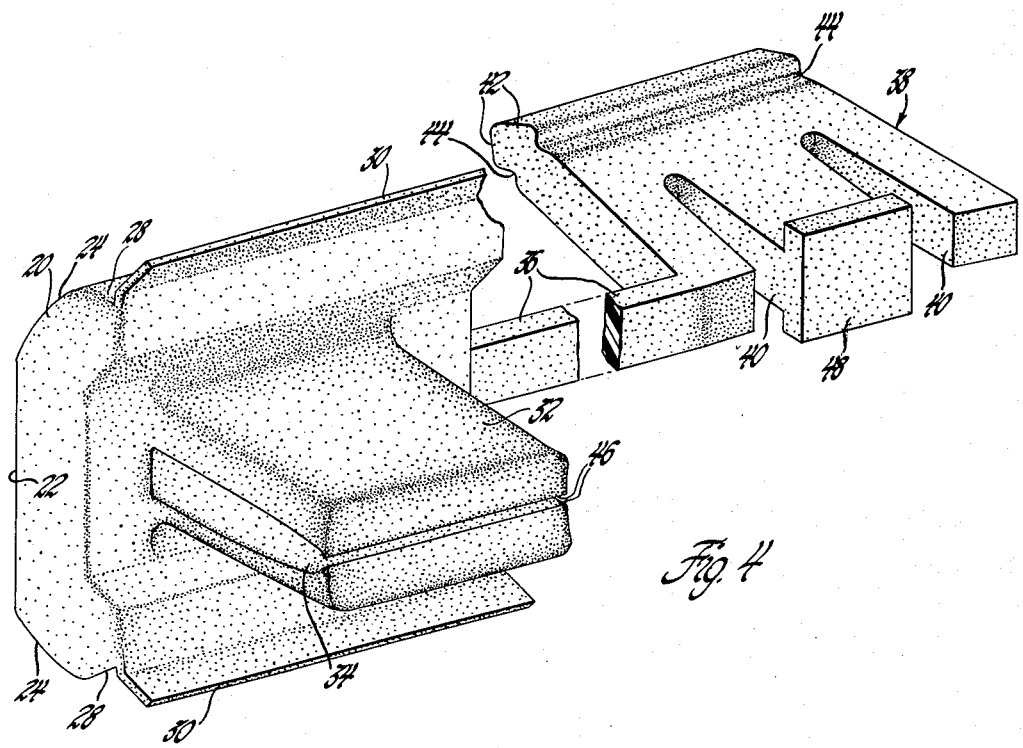
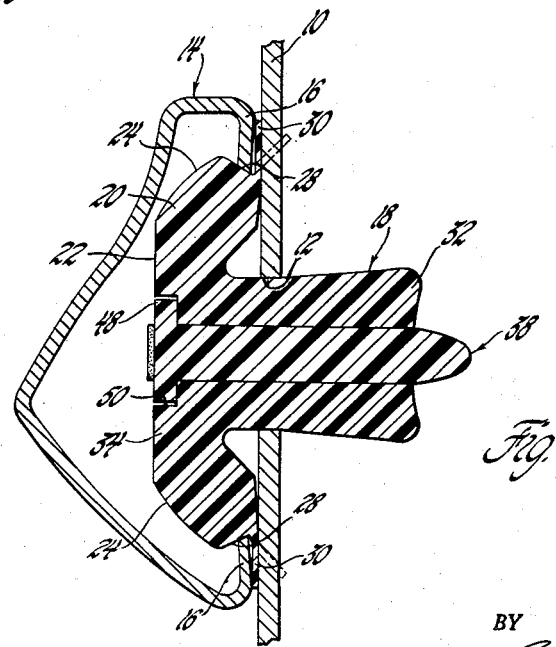
INVENTOR.
Engelbert A. Meyer
BY
E. W. Christen
ATTORNEY

United States Patent Office 3,114,949
Patented Dec. 24, 1963

3,114,949
FASTENING DEVICE
Engelbert A. Meyer, Pontiac, Mich., assignor to General Motors Corporation, Detroit, Mich., a corporation of Delaware
Filed Jan. 10, 1961, Ser. No. 81,818
3 Claims. (Cl. 24—73)

This invention relates to a fastening device, and more particularly to a resilient fastener for securing an ornamental strip to a supporting panel.

In the design and manufacture of many articles, such as automobiles and the like, it is often desired to add ornamental molding strips at various places for both esthetic appeal and to cover up unsightly seams and joints. Molding fasteners are commonly used for such purposes and usually are inserted in a suitable aperture in the supporting panel and are provided with some means for retaining the molding strip. In the past, molding fasteners have required rather complex means of retention in order to secure themselves in the molding panel. It is possible to utilize two-piece fasteners wherein a first part is inserted in the panel and a second part is inserted in the first part in order to secure both and the molding strip. These are generally made of two separate pieces, one of which may become lost or may be inserted incorrectly, resulting in an imperfect retention of the fastener and the molding strip. A further consideration is the problem involved in sealing the aperture in the supporting panel to prevent the entry of moisture and a beginning point for rust and corrosion. With generally available fasteners of the two-piece type, it is difficult to mount the fastener in such a manner as to positively retain the fastener and the molding strip and to seal the aperture in the supporting panel.

The device in which this invention is embodied comprises, generally, a plastic fastener of the two-part type wherein the two parts are connected by an integral strap. The first part is inserted in the aparture in the supporting panel and the second part is inserted in the first part to positively secure and seal the clip in the supporting panel. With such a construction it is possible to insert the second part in only one way and it is impossible for one part to become lost during an assembly procedure. Positive retention is obtained as well as a sealed installation which prevents the possibility of rust and corrosion.

These and other advantages will become more apparent from the following description and drawings, in which:

FIGURE 4 is an isometric view of the fastening device in its uninstalled position; and FIGURE 5 is a cross-sectional view of a molding installation substantially the same as that illustrated in FIGURE 1 but showing a modification of the fastening device.

Figure 1:
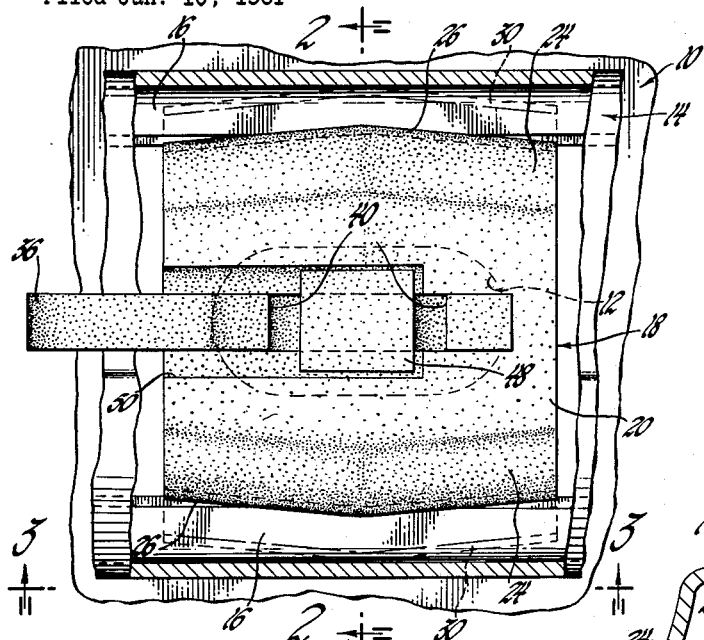
FIGURE 1 is a plan view of a molding installation with parts broken away and in section to illustrate the molding fastener.
Figure 2:
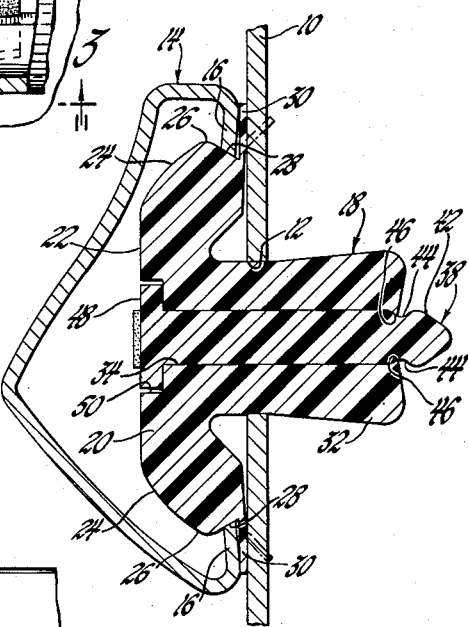
FIGURE 2 is a cross-sectional view of the installation illustrated in FIGURE 1 taken substantially along the line 2—2 of FIGURE 1 and looking in the direction of the arrows.
Figure 3:
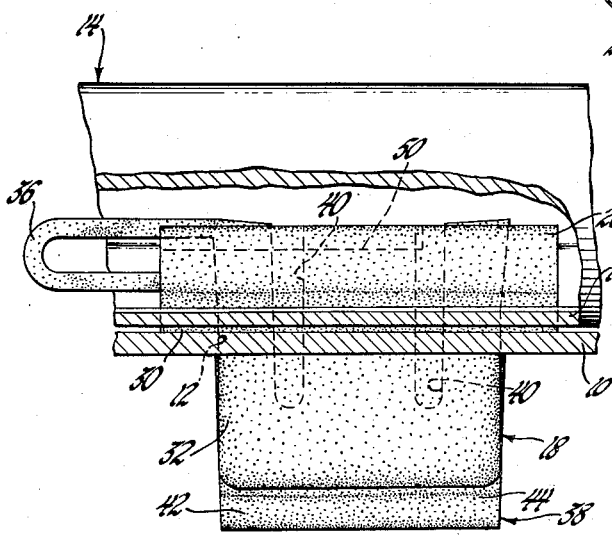
FIGURE 3 is an elevational view of the molding installation illustrated in FIGURE 1 taken substantially along the line 3—3 of FIGURE 1, looking in the direction of the arrows and with parts broken away and in section to illustrate the molding fastener.

Referring more particularly to the drawings, FIGURES 1–3 best illustrate the molding installation. A supporting panel 10, which may be any suitable panel on a motor vehicle, or the like, is provided with a plurality of elongated apertures 12. A generally U-shaped molding strip 14 is to be secured to the panel 10. The molding strip 14 is provided with inturned flanges 16, extending along the length of the edges thereof to provide some means for receiving a fastening device, illustrated generally by the numeral 18, to secure the molding strip 14 to the supporting panel 10.

The fastening device 18 may be formed of any suitable resilient material, such as plastic, and is receivable in the aperture 12 in the supporting panel 10. As viewed in the drawings, the fastener 18 is shown to include a body 20 of generally rectangular shape. Body 20 has a flat upper surface 22 which blends into inclined surfaces 24 on opposite sides thereof, the inclined surfaces terminating at edges 26. The body is then formed inwardly, as illustrated at 28, to provide suitable grooves along the length of the body 20 to receive the inturned flanges 16 of the molding strip 14.

Body 20 may also be provided with flanges 30 extending from the undersurface thereof which lie between the molding strip 14 and the body panel 10. The purpose for flanges 30 is to prevent contact between the molding strip 14 and the panel 10 and a resultant chipping of the paint, or the like, acting as a starting point for rust and corrosion. It is to be understood that flanges 30 are not absolutely necessary to the preferred form of the invention.

Integrally formed from the body 20 of the fastening device 18 is a socket portion 32 which extends from the body portion and in the direction of the aperture 12 in the supporting panel 10. In its free form the socket portion 32 is provided with surface elements parallel to the axis of the socket portion 32. This provides a uniform cross-sectional configuration substantially the same as that of the aperture 12, and the socket portion 32 is freely insertable in the aperture 12.

The body 20 and integrally formed socket portion 32 are provided with an axial elongated slot 34 which is tapered inwardly in the direction of the remote end of the socket portion 32. Slot 34 has a width substantially the same as the length of aperture 12 and may extend completely across socket portion 32. The purpose for slot 34 will be later described.

Also integrally formed from the body 20 and extending therefrom is a web or strap 36 which terminates in a stud portion 38, best shown in FIGURE 4. The stud portion 38 is generally rectangular in cross-section and has surface elements parallel to the central axis thereof. This provides a generally uniform rectangular cross-sectional configuration. The stud portion 38 is receivable in the elongated slot 34 formed in the body portion 20 and the socket portion 32, as will be hereinafter described. A pair of slots 40 may be provided between the edges of the stud portion 38, extending lengthwise of the stud portion and terminating at a point intermediate the ends of the stud portion 38 to permit contraction of the stud portion as it is installed. The width of the stud portion 38 may be slightly greater than the length of slot 34, such that in the installation of the fastener, by inserting the stud portion in the slot 34, the entire slot 34 will be closed by the body of the stud portion 38. Stud portion 38 may be provided with slightly tapered surfaces 42 along the outer end thereof for ease in inserting the stud portion in the body 20.

FIGURES 2, 3 and 4 show the stud portion 38 having grooves 44 extending along the width thereof and adjacent the end of the stud portion 38. Grooves 44 may engage inturned portions 46 formed at the ends of the socket portion 32 and at the termination of the slot 34 in order to positively secure the stud portion in the socket portion 32. A modification of stud portion 38 is illustrated in FIGURE 5 wherein the end of the stud portion 38 is shown to be smooth and the surface of the elongated slot 34 is equally smooth, the stud being retained in the socket portion 32 by means of the frictional engagement due to the tapered slot 34.

Stud portion 38 may be provided with an enlargement 48 between the openings of the two slots 40, and body portion 20 may be provided with a groove 50 of substantially the same dimension as enlargement 48, to limit the advance of the stud portion 38 into the slot 34 and to provide a flush mounting.

In making the molding strip installation illustrated in FIGURES 1–3, the fastener 18 is first inserted in the aperture 12 formed in the supporting panel 10. The socket portion 32 passes easily through the aperture 12, since it is provided with surface elements parallel to the axis of the socket portion. The stud portion 38 is then inserted in the elongated slot 34 by bending strap 36 back upon itself, and is pressed completely into the body and socket portion until the enlargements 46 in the slot 34 of the socket portion 32 are received in the slots 44 formed in the stud portion 38. Thus, the fastener 18 is securely mounted in the supporting panel 10. The molding strip 14 is then placed adjacent the fastener 18 such that the inner edges of the flanges 16 engage inclined surfaces 24 formed on the body 20 of the fastener 18. The molding strip 14 is then forced toward the supporting panel 10 until the flanges 16 override the enlargements 26 of the body 20 and snap into place in the grooves formed by the inclined surfaces 28. Thus, the molding strip is securely positioned on the supporting panel 10.

Thus, a fastening device is provided which is of the two-part type and yet is of one piece construction. It is easily seen that it is not possible to lose one of the two parts or to insert one of the parts improperly. It is also seen that the enlargement of the socket portion 32 on the opposite side of the supporting panel 10 from the body 20 of the fastening device causes a seal around the aperture 12 in the supporting panel. The greater width of the stud portion 38 over the length of the elongated slot 34 provides a positive seal between the two parts to prevent that avenue of moisture passage. The fastening device provides a positive and sealing retention of a decorative strip on a supporting panel.

What is claimed is:

1. A resilient fastener for securing a molding strip having inturned flanges along the edges thereof to a supporting panel having an aperture therein and comprising a body having an enlarged portion greater in dimension than the distance between the edges of said inturned flanges on said molding strip and being receivable therebetween, a socket portion integrally formed from said body having surface elements normal to the plane of said body and being receivable in said aperture in said supporting panel, said body and said socket portion having an elongated tapered slot formed axially therethrough, a strap integrally formed from said body and extending therefrom, a stud portion integrally formed from said strap and extending therefrom, said stud portion being slightly wider than the length of said slot in said body portion and said socket portion and being receivable in said slot, means in said stud portion to permit a decrease in the width of said stud portion when inserted in said slot, said socket portion being insertable in said aperture in said supporting panel and said stud portion being insertable in said body and said socket portion to expand said socket portion on the opposite side of said panel from said body to retain said fastener and said molding strip on said panel and to seal said aperture in said panel and said slot in said body and in said socket portion.

2. The fastener set forth in claim 1 wherein said stud portion is provided with grooves along each side thereof and spaced from the outer end thereof adapted to receive the inner edges of the end of said socket portion for positive retention of said stud portion in said body and said socket portion.

3. The fastener set forth in claim 1 and further including a flange extending along the length of said body and along each side thereof and adapted to lie between said molding strip and said supporting panel and prevent engagement therebetween.

References Cited in the file of this patent

UNITED STATES PATENTS

| | | |
|---|---|---|
| 2,681,716 | Black | June 22, 1954 |
| 2,748,645 | Peckham et al. | June 5, 1956 |
| 2,937,834 | Orenick et al. | May 24, 1960 |
| 2,948,062 | Tinnerman | Aug. 9, 1960 |
| 2,969,216 | Hallsey | Jan. 24, 1961 |
| 3,019,498 | Brown | Feb. 6, 1962 |
| 3,059,739 | Cochran | Oct. 23, 1962 |

FOREIGN PATENTS

| | | |
|---|---|---|
| 684,098 | Great Britain | Dec. 10, 1952 |
| 788,742 | Great Britain | Jan. 8, 1958 |
| 1,211,073 | France | Oct. 5, 1959 |
| 1,220,181 | France | Jan. 4, 1960 |
| 1,222,697 | France | Jan. 25, 1960 |